United States Patent
Ittelson (10) Patent No.: US 12,057,949 B2
(45) Date of Patent: Aug. 6, 2024

(54) SYSTEMS AND METHODS FOR IDENTIFYING AT-RISK MEETINGS

(71) Applicant: Zoom Video Communications, Inc., San Jose, CA (US)

(72) Inventor: Brendan James Ittelson, San Jose, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/162,174

(22) Filed: Jan. 29, 2021

(65) Prior Publication Data
US 2022/0247588 A1   Aug. 4, 2022

(51) Int. Cl.
*H04L 12/18*     (2006.01)
*G06Q 50/00*     (2012.01)

(52) U.S. Cl.
CPC ......... *H04L 12/1818* (2013.01); *G06Q 50/01* (2013.01); *H04L 12/1822* (2013.01)

(58) Field of Classification Search
CPC .... G06Q 50/01; G06Q 10/067; G06Q 10/109; G06Q 30/0282; H04L 12/1818; H04L 12/1822; H04L 12/2809; H04L 63/14; H04L 63/1416; H04L 63/1425; H04L 63/1433; H04L 63/1441; H04L 63/1466; H04L 63/1475; H04L 63/1483; H04L 63/20; H04L 63/06; G06F 21/6218; G06F 21/64; G08B 19/005; H04M 1/2535; H04N 7/142; H04N 7/15; H04N 7/152
See application file for complete search history.

(56) References Cited

U.S. PATENT DOCUMENTS

| | | | | |
|---|---|---|---|---|
| 2004/0003042 A1* | 1/2004 | Horvitz | ............... | G06Q 10/109 709/204 |
| 2010/0092003 A1* | 4/2010 | Gygax | ................... | H04N 7/142 381/66 |
| 2012/0069131 A1* | 3/2012 | Abelow | ............... | G06Q 10/067 348/14.01 |
| 2014/0340469 A1* | 11/2014 | Swanson | ................ | H04N 7/152 348/14.09 |
| 2015/0092009 A1* | 4/2015 | DeLuca | ................... | H04N 7/15 348/14.08 |
| 2015/0156031 A1* | 6/2015 | Fadell | .................. | G08B 19/005 700/276 |
| 2015/0163206 A1* | 6/2015 | McCarthy | ............... | H04L 63/06 713/171 |
| 2017/0293763 A1* | 10/2017 | Shear | ................... | G06F 21/6218 |
| 2018/0302791 A1* | 10/2018 | Johnson | .............. | H04M 1/2535 |
| 2019/0222560 A1* | 7/2019 | Ford | ....................... | G06F 21/64 |
| 2020/0311790 A1* | 10/2020 | Keren | ................ | G06Q 30/0282 |
| 2020/0313924 A1* | 10/2020 | Park | .................... | H04L 12/2809 |

* cited by examiner

*Primary Examiner* — Le H Luu
(74) *Attorney, Agent, or Firm* — Kilpatrick Townsend & Stockton LLP (57) ABSTRACT

One example method for identifying at-risk meetings includes receiving, by a video conferencing system, access data potentially associated with a virtual meeting and a source of the access data, identifying the virtual meeting associated with the access data, determining a risk score based at least in part on the access data, the source of the access data, and a meeting property associated with the virtual meeting, the risk score indicating a likelihood of meeting disruption based at least in part on the risk score, and responsive to determining that the likelihood of meeting disruption exceeds a risk threshold, generating a notification message.

20 Claims, 5 Drawing Sheets

SYSTEMS AND METHODS FOR IDENTIFYING AT-RISK MEETINGS

FIELD

The present application generally relates to video conferences and more particularly relates to systems and methods for identifying at-risk meetings.

BACKGROUND

Videoconferencing has become a common way for people to meet as a group, but without being at the same physical location. Participants can be invited to a video conference meeting, join from their personal computers or telephones, and are able to see and hear each other and converse largely as they would during an in-person group meeting or event. The advent of user-friendly video conferencing software has enabled teams to work collaboratively despite being dispersed around the country or the world. It has also enabled families and friends to engage with each other in more meaningful ways, despite being physically distant from each other.

SUMMARY

Various examples are described for systems and methods for identifying at-risk meetings. One example method includes receiving, by a video conferencing system, access data potentially associated with a virtual meeting and a source of the access data, identifying the virtual meeting associated with the access data, determining a risk score based at least in part on the access data, the source of the access data, and a meeting property associated with the virtual meeting, the risk score indicating a likelihood of meeting disruption based at least in part on the risk score, and responsive to determining that the likelihood of meeting disruption exceeds a risk threshold, generating a notification message.

An example system includes a non-transitory computer-readable medium; a communications interface; and a processor communicatively coupled to the non-transitory computer-readable medium and the communications interface, the processor configured to execute processor-executable instructions stored in the non-transitory computer-readable medium to: receive, by a video conferencing system, access data potentially associated with a virtual meeting and a source of the access data, identify the virtual meeting associated with the access data, determine a risk score based at least in part on the access data, the source of the access data, and a meeting property associated with the virtual meeting, the risk score indicating a likelihood of meeting disruption based at least in part on the risk score, and responsive to determining that the likelihood of meeting disruption exceeds a risk threshold, generate a notification message.

One example non-transitory computer-readable medium includes processor executable instructions to cause a processor to receive, by a video conferencing system, access data potentially associated with a virtual meeting and a source of the access data, identify the virtual meeting associated with the access data, determine a risk score based at least in part on the access data, the source of the access data, and a meeting property associated with the virtual meeting, the risk score indicating a likelihood of meeting disruption based at least in part on the risk score, and responsive to determining that the likelihood of meeting disruption exceeds a risk threshold, generate a notification message.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of systems and methods for identifying at-risk meetings. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing systems enable their users to create and attend video conferences (or "meetings") via various types of client devices. Unfortunately, as video conferences have become more popular and commonplace, so has the likelihood that uninvited third parties may try to disrupt a meeting. Often, would-be disruptors post access data about meetings on social media sites and invite others to also engage in disrupting the meeting.

In one example system, a video conferencing provider searches various social media platforms to identify data that might be used to access a virtual meeting. The access data might be identified, for example, because it contains a meeting identifier number. Once the video conferencing provider has identified the access data, the provider may also obtain additional information, such as the source of the access data, e.g., a social media post by a particular third party. The video conference provider might retrieve additional context information or data regarding the post. For instance, the post may include text that identifies a virtual meeting provider, such as Zoom Video Communications, or text, such as "let's disrupt this meeting," a hashtag, such as #meeting or #ZoomMeeting or other terms that may be associated with disruption like #Disrupt, or other information indicative of a potential disruption.

The video conference provider can then use the access data to identify a virtual meeting that may be at-risk, for example, the meeting may be targeted for disruption. In the example system, once the meeting is identified, the video conference provider can determine a risk score that indicates the likelihood that the particular virtual meeting is likely to be disrupted. If the meeting is likely to be disrupted, the video conferencing provider can generate a notification for the host of the meeting, the account administrator, or other appropriate user, indicating the likelihood of disruption and suggest potential steps to take to lessen the likelihood of disruption.

When the meeting host receives the message, the meeting host can take steps to lessen the likelihood of disruption. For example, the host may change the security parameters of the meeting, such as by adding a waiting room to the virtual meeting. In some instances, the host might instead cancel the meeting. In some example systems, the video conference provider can modify the virtual meeting without the host's involvement. For example, if the likelihood of disruption is greater than a particular threshold, the video conference provider may automatically modify security settings associated with the meeting, such as to add a waiting room where participants are first placed when they are joined, which requires the host to explicitly admit them to the meeting itself. And in some cases, the video conference provider might limit the access of an uninvited participant or even block the access of an uninvited participant.

Systems and methods such as those described herein provide numerous advantages. For example, such systems allow the video conference system to remain an open platform that anyone can join in, while simultaneously limiting or avoiding disruptions caused by invited and uninvited participants. Further, such systems provide transparency by notifying the host in a proactive manner that a disruption may occur, potential steps that may be taken, and the context of the information that suggests a disruption may occur.

This illustrative example is given to introduce the reader to the general subject matter discussed herein and the disclosure is not limited to this example. The following sections describe various additional non-limiting examples and examples of systems and methods for identifying at-risk meetings.

Figure 1:
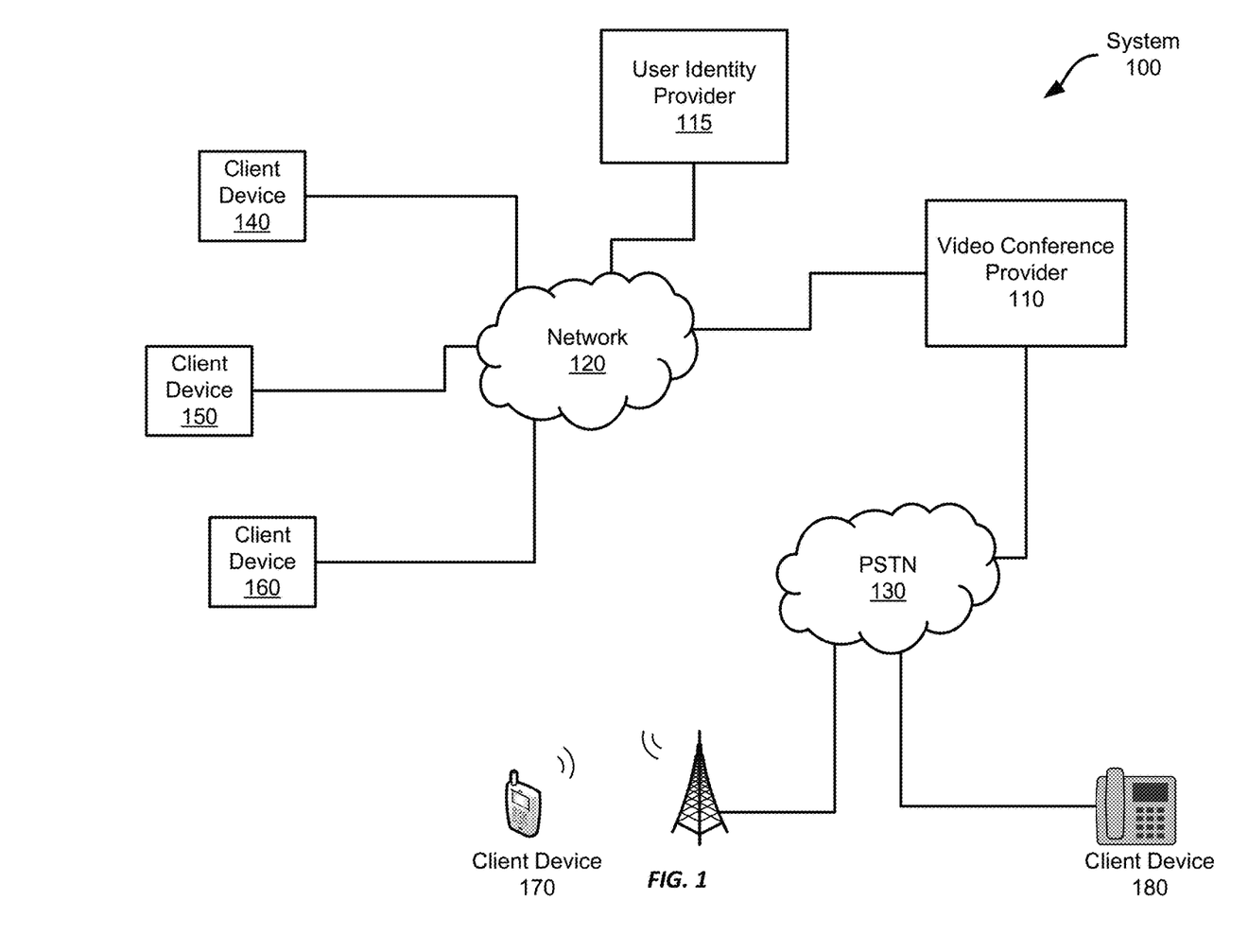
FIGS. 1-3 illustrate example video conference systems to enable identifying at-risk meetings.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
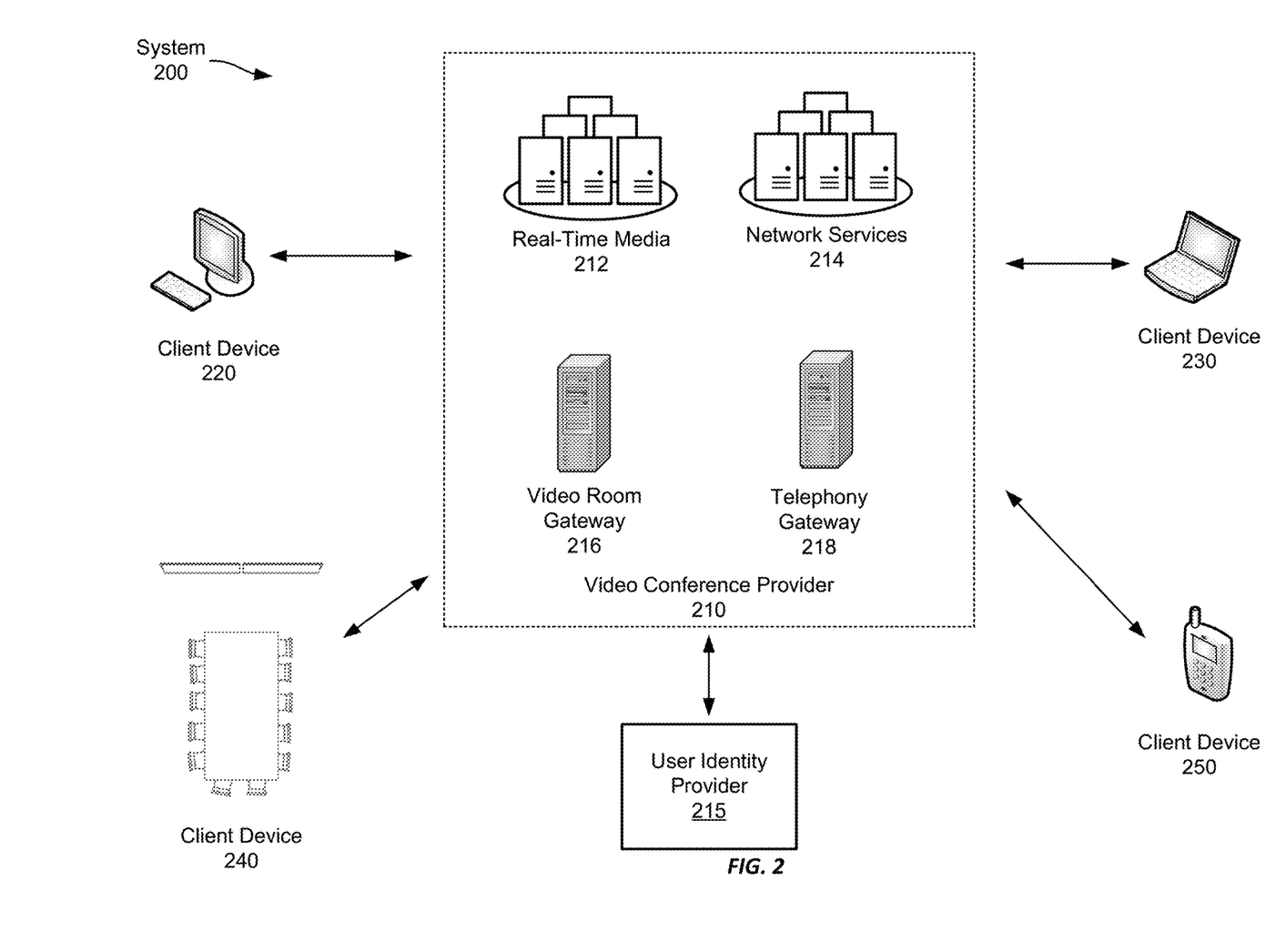

Video conference provider 110 allows clients to create videoconference meetings (or "meetings") and invite others to participate in those meetings as well as perform other related functionality, such as recording the meetings, manage user functionality in the meetings, enable text messaging during the meetings, create and manage breakout rooms from the main meeting, etc. FIG. 2, described below, provides a more detailed description of the architecture and functionality of the video conference provider 110.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from dedicated video conferencing equipment to laptop or desktop computers to handheld devices to legacy telephony devices.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference provider 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
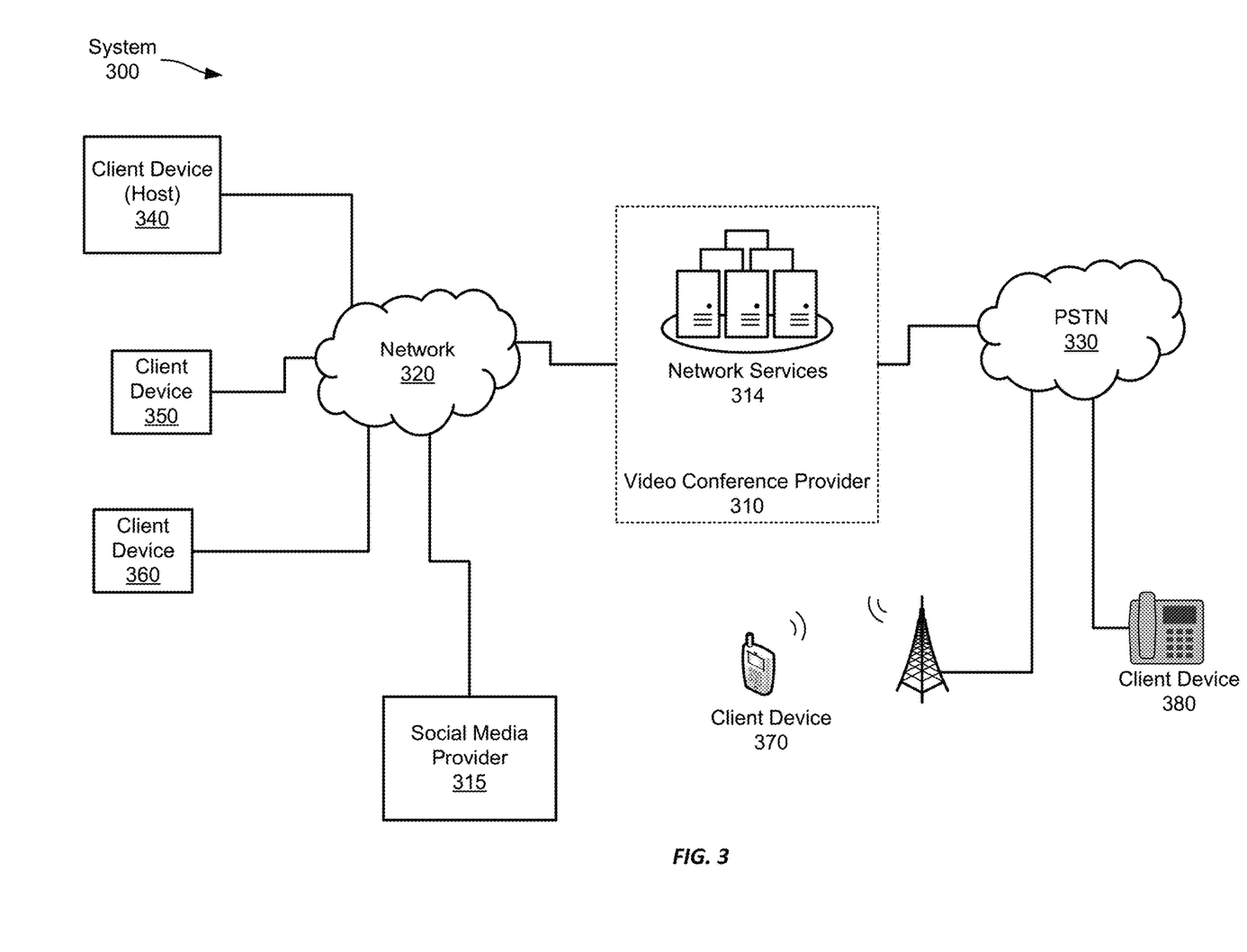

Referring now to FIG. 3, FIG. 3 illustrates an example system 300 for identifying at-risk meetings that includes components similar to those shown in FIGS. 1 and 2. In this example, the system includes a social media provider 315 through which individuals interact and on which individuals may share information necessary to access various online services, including video conference services provided by the video conference provider 310. While this example system only illustrates one social media provider 315, it should be appreciated that any number of social media providers may be included.

The social media provider 315 may include, for example, websites, databases, or other data stores for systems that allow users to share content or otherwise participate in social networking.

The content shared by users may include, for example, posts in text form, documents, videos, or images. Such content may include data that would allow access to a virtual meeting. For example, such content may include a uniform resource link ("URL") that when accessed from a web browser, would allow a user, such as a user accessing the shared content, to access a virtual meeting associated with the URL. In another example, the content may include meeting identifiers or passcodes, and potentially the name of a video conference provider, to enable access to a meeting hosted by the video conference provider. In some cases, a social media post may include a link to information to obtain meeting access information, e.g., "Let's disrupt the $6^{th}$ grade class tomorrow! Click the link below to get the meeting information."

In this example, once content has been created on the social media provider 315, the video conference provider 310 may access the social media provider 315 in order to search for and identify access data shared on servers of the social media provider 315. The access data may be associated with a virtual meeting. For example, the content itself may be sufficient to allow a third party to access a virtual meeting.

In one example, a user posts a link on their social media page that includes a link to an upcoming virtual meeting. The post is stored on the social media provider 315 and made accessible to other users on the social media provider 315. The video conference provider 310 is then able to access the social media provider 315 in order to search for potential meeting access information, access the user's post, and identify a potential risk to the meeting.

Figure 4:
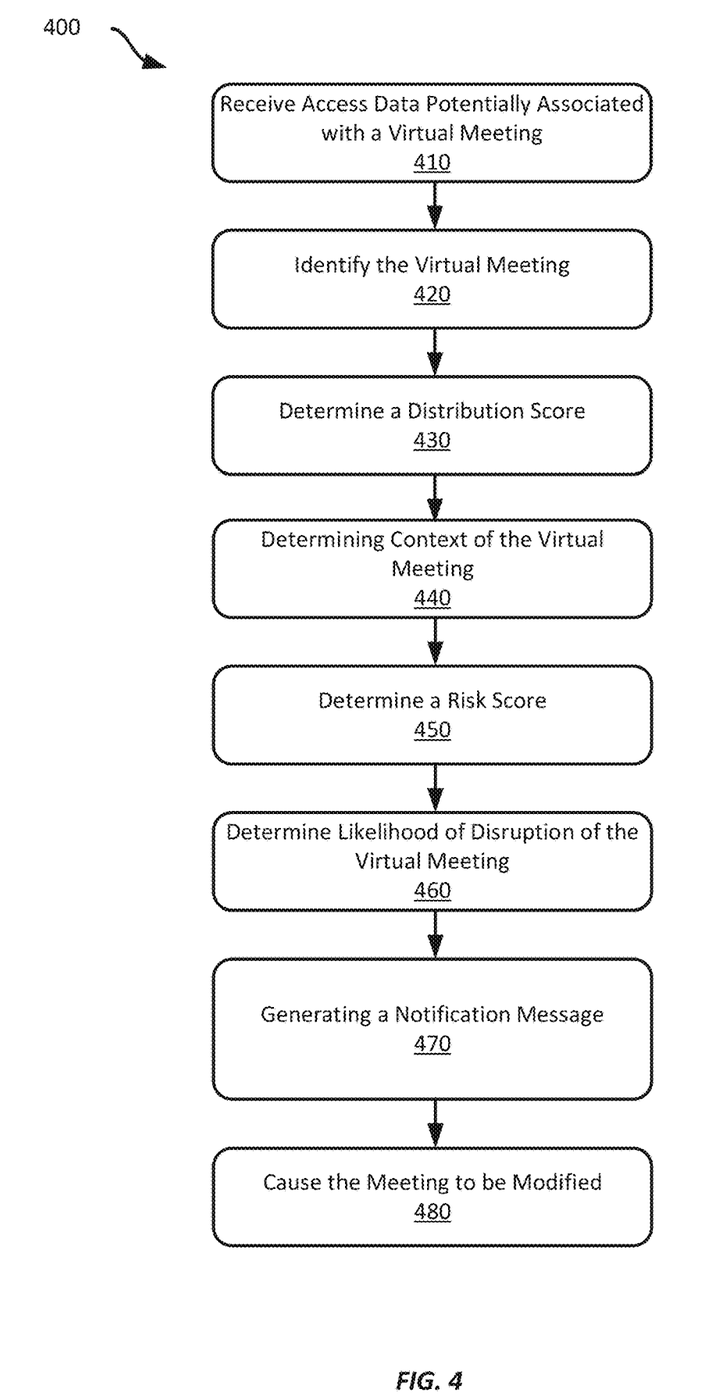
FIG. 4 illustrate an example method for identifying at-risk meetings.

Referring now to FIG. 4, FIG. 4 illustrates an example method 400 for identifying at-risk meetings. The description of the method 400 in FIG. 4 will be made with reference to the system shown in FIG. 3; however any suitable system according to this disclosure may be used, such as the example systems 100, and 300 shown in FIGS. 1-3.

At block 410, the video conference provider 310 receives access data that may potentially be associated with a virtual meeting. For example, the video conference provider 310 may include a search algorithm that searches one or more social media providers, e.g., social media provider 315, for access data that may be associated with one or more virtual meetings. The search may be performed in a particular order based on the likelihood that access data may appear on a particular platform. Further, example systems may use conventional crawling techniques. Other example systems may also use existing search engines as part of a strategy for locating access data.

Access data may include, for example, URL links for virtual meetings, meeting identifiers, meeting passcodes, an identity of a video conference provider, a date or time for the meeting, a URL link to access information for the meeting, etc. While social media provider 315 is depicted in FIG. 3 as a single element, social media provider 315 may include multiple systems, including various data stores, as described above. And the search algorithm may search across these virtual systems. And while the system 300 shown in FIG. 3 includes one social media provider, some examples may access multiple different social media providers to search for meeting access data.

Social media provider 315 is just an example of a type of source of data that a search algorithm may search. For example, the search algorithm may be able to search messaging platforms, such as email providers, online collaboration tools, etc., for access data. Similarly, the search algorithm may be able to search websites other than social media websites to identify access data that may be associated with a virtual meeting. This description of sources for access data is not exhaustive.

To identify access data, the search algorithm may search for information with a particular format or with particular keywords. For example, meeting identifies may be 9- or 11-digit numbers, sometimes with internal spacing, e.g., 123 456 789. Similarly, meeting passcodes may include short strings of characters, e.g., alphanumeric characters, punctuation, etc., that are located in close proximity, e.g., within 5-10 words, to a meeting identifier in the social media post. Similarly, particular keywords may be used to identify potential access data, e.g., "meeting ID," "meeting identifier," "meeting number," "passcode," "password," etc. Further surrounding context from the social media post may further indicate potential meeting identifiers or passcodes are present, such as keywords like "disrupt," "meeting," "stop," etc.

In analyzing social media posts, the search algorithm may score a post based on the presence of one or more of the characteristics above. For example, 9- or 11-digit numbers that may be a meeting identifier may contribute a number of points to the post's score, e.g., 10 points. If a potential meeting passcode is identified, it may contribute more points, e.g., another 10 points, or it may be used as a multiplier to the meeting identifier's points, e.g., it may double the number of points. Similarly, other indicia located within the social media post may further add points or otherwise increase the score.

After determining a score for the social media post, the search algorithm may determine whether the social media post is likely sharing access data. For example, if the score exceeds a predetermined threshold, it may be flagged as sharing meeting access data.

When the search algorithm of the video conference provider 310 identifies access data that may potentially be associated with a virtual meeting, the search algorithm also identifies the source of the access data and provides that to the video conferencing provider 310.

For example, if the search algorithm locates a post on a social media provider 315 that includes access data that may identify a virtual meeting, the search algorithm can also capture the source of that access data. The source may include, for example, the social media platform name, the IP address of the server, the social media handle of the user posting the data, the date of the post, or any other type of data identifying the source of data. This type of data is sometimes referred to as "metadata."

It is possible that the social media provider receives access data and then determines that the access data is not associated with a virtual meeting or a virtual meeting that has already occurred. For instance the access data may include an eleven-digit number that appears to be a meeting identifier number but is not. Alternatively, the access data may include a meeting identifier or meeting passcode that is not valid. After receiving access data potentially associated with a virtual meeting, the method proceeds to block 420.

At block 420 the video conferencing provider 310 identifies a virtual meeting associated with the access data. For example, the access data may include a meeting identifier that can be used by the video conferencing provider 310 to identify a particular meeting. Other types of data may be used to identify a meeting. For example, text retrieved as part of the access data may include information, such as a time and description, that allows the video conferencing system to identify a virtual meeting.

The source of the access data may also provide information that the video conferencing provider 310 can use to identify a virtual meeting. For example, that access data was obtained from a particular site or in relation to a particular user may provide the video conference provider 310 with sufficient information to identify one or more virtual meetings associated with the access data. For example, the video conference provider 310 may be identify a registered user based on the name of the user who posted the social media post, or it may be able to identify a host of an upcoming meeting from such information. After identifying the virtual meeting, the method proceeds to block 430.

At block 430 the video conferencing provider 310 determines a distribution score. The distribution score provides an indicator of the extent to which the access data has been distributed. For example, the distribution score may comprise a social outreach score, indicating the degree to which particular access data was distributed across a social media provider 315. In such a case, the distribution score may also depend on the source of the access data.

For example, a particular instance of access data may have been shared by hundreds of users on a social media provider 315. Such access data would be associated with a higher social outreach score and thus a higher distribution score than access data shared by a single user. The data used to determine a social outreach score may be used in other ways. For example, one system provides graphs to indicate the degree to which the access data has been shared. Such graphs may indicate geography, organizations, or other indicators of the degree to which such data has been distributed. Similarly, access data identified across a large number of social media providers or other sources of access data would be associated with a higher distribution score than access data shared by a single user via a single social media provider 315.

The distribution score may also be determined based on a property of a virtual meeting, referred to herein as a meeting property. The meeting property reflects how the meeting has been created and configured. For example, if a meeting is created as a public conference, e.g., the meeting property is "public," it may be expected that the access data would be widely distributed. And so the distribution score might be reduced relative to a private meeting for which access data was equally widely distributed. Thus, the distribution scores of a private and a public meeting could be compared directly once the meeting property had been used to adjust an original or raw distribution score. The risk score may be based on relative public accessibility which may be related to a distribution score or may be independent of the distribution score. For example, a non-public meeting with tens or hundreds of participants would be considered more public than a meeting with only a few participants. To the extent that the notice of this meeting is widely distributed, such a meeting would also have a high relative public accessibility. In one example, the risk score is related to a security setting associated with a meeting. For instance, in a meeting in which all participants can perform screen sharing, any user can essentially control the meeting. Such meetings are relatively more likely to be disrupted by an uninvited participant than a webinar or than a meeting that includes a waiting room.

In one example, the risk score is based on a reputation score. The reputation score may be associated with a meeting participant, such as the host of the meeting or with a post that includes a link to the meeting, such as the person who made the post or the site on which the post appears. The reputation score may be maintained and developed over time by the video conference provider 310 and can provide a measure of how likely the participant is to, for example, have a meeting disrupted or how likely third parties are to disrupt a meeting. The reputation score may, for example, indicate that the participant has previously had its meetings disrupted. The reputation score may be based, at least in part, on behavioral patterns identified as potentially more likely to be associated with a disrupted meeting. For example, in some distance learning environments, such as high schools, particular patterns of past actions students might indicate that a disruption of a particular teacher's class is more likely to occur. After determining a distribution score, the method proceeds to block 440.

At block 440, the video conference provider 310 determines context of the virtual meeting. For example, the video conference provider 310 may access information about the meeting, such as a description of the meeting to determine topics to be covered. Alternatively, the video conference provider 310 may determine based on a meeting property that the is related to an education event. Some meetings may include URLs identifying material to be covered in the meeting. And the video conference provider 310 could use such information to identify the context of the meeting. In some examples, the video conference provider 310 may utilize a plurality of meeting-related information, such as those discussed above, to determine the context of a meeting. After determining a context of the virtual meeting, the method proceeds to block 450.

At block 450, the video conference provider 310 determines a risk score. The risk score may be related to a particular virtual meeting. The risk score may also be related to a group of related virtual meetings. The risk score may be based on a variety of information related to the virtual meeting. In one example, the risk score is based at least in part on the access data, the source of the access data, and a meeting property associated with the virtual meeting. Additional factors may include the distribution score, the meeting content, a reputation score of one or more users that posted the meeting access data, whether the meeting is public or private, etc. as discussed above. After determining a risk score, the method proceeds to block 460.

At block 460, the video conference provider 310 determines the likelihood that the virtual meeting might be disrupted based at least in part on the risk score. While this example describes the meeting as being at-risk because it is subject to disruption. Meetings may be considered at-risk for other reasons. For example, if a meeting is top secret but then a link to the meeting is found in a publicly-available post, that meeting might be considered at-risk. Similarly, if a meeting is limited to a small group of invited participants, but links to the meeting are broadly distributed, the meeting may be considered at-risk. Various other context of meetings, of posts, and of the individuals associated with the meetings and the posts may also indicate that a particular meeting is at risk. Disruption, as described in relation to FIG. 4, occurs when a user joins a meeting unexpectedly, such as when an uninvited individual joins the meeting. For example, the risk score may be calculated as a numeric value. The likelihood of disruption may then be directly related to the risk score. In some examples, the risk score itself may indicate the likelihood of disruption. For instance, if the risk score is above a certain threshold, the virtual meeting may be identified as likely to be disrupted. Multiple thresholds may be utilized. For example, thresholds for likelihood of disruption might indicate that a meeting is very unlikely, unlikely, likely, or very likely to be disrupted.

The video conference provider 310 may determine the likelihood of disruption based on information in addition to the risk score. For example, if historically, a high number of disruptions are expected to occur on a particular date, the likelihood of disruption may increase even though the risk score based on the access data, source of the access data, and meeting property does not change. As another example, if particular meeting hosts are being targeted for disruption for some reason, the likelihood of disruption may be increased independently of the determined risk score. In one example, the likelihood of disruption is directly related to the relative public accessibility of a meeting, e.g., the more public the meeting, the more likely it is to be disrupted.

In some cases, the risk score and likelihood of disruption may depend on information related to other virtual meetings. For example, in some cases, the video conference provider 310 might identify access data related to a virtual meeting on a social media provider 315 after the virtual meeting concludes. While the existence of the access data cannot be used to calculate the risk score and likelihood of disruption for the virtual meeting associated with the access data, the existence of the access data might be used to determine a risk score and/or likelihood of disruption for other similar or related virtual meetings that occur after the access data is received and processed.

The likelihood of disruption may be determined in a number of ways. One example employs a trained machine learning ("ML") technique to analyze the risk score to determine the likelihood of disruption. The underlying architecture of different kinds of artificial intelligence systems and ML techniques are well known and so are not described in detail herein. To perform the analysis, the trained ML technique may be provided with a set of previously-computed risk scores and an indication of which meetings were subject to disruptions.

While these examples are described in terms of disruption, such systems may be used for other related purposes. For example, on such system receives access data and related data that suggests a meeting associated with the access data may violate terms of service for a video conference provider 310. For example, if the context of the meeting, as determined above, is likely to include material that is prohibited by the terms of service, the video conference provider 310 may identify the meeting as a high risk meeting. After determining the likelihood of disruption of the virtual meeting, the method proceeds to block 470.

At block 470, the video conference provider 310 may generate a notification message. For example, if the video conference provider 310 determines that a high likelihood exists that the virtual meeting will be disrupted, the video conference provider 310 may send a message to the host of a virtual meeting suggesting that the host modify the meeting. In other examples, the notification may be sent to all the participants, to an account administrator, the video conference provider, or anyone that might wish to react to or note that the virtual meeting is likely to be disrupted. For instance, an account administrator may wish to closely monitor a meeting that is likely to be disrupted so that if a disruption occurs, the administrator can take action. In one example, the message includes suggestions for modifying security settings to help decrease the likelihood that the virtual meeting will be disrupted. In other cases, the message might include a suggestion that the host reschedule or cancel the meeting. The message may be generated before the meeting begins or during the meeting.

In some examples, multiple messages may be sent to the host based on changes to the likelihood of the meeting being disrupted. For instance, during a meeting, the video conference provider might identify access data that causes the risk score to increase, thereby increasing the likelihood that the ongoing meeting will be disrupted. In such cases, the video conference provider may generate additional notification messages with suggestions for the host. After generating a notification message, the method proceeds to block 480.

At block 480, the video conference provider 310 or host causes the meeting to be modified. For example, in the case of a public meeting, the host might enable a waiting room so that participants must be individually admitted to a meeting. Alternatively, the host may decide to reschedule a meeting.

In some cases, the video conference provider 310 may automatically modify a meeting. For instance, if a meeting is extremely likely to be disrupted, the video conference provider 310 might, in addition to generating a notification message, proactively change the meeting properties to enhance the security of a virtual meeting. In some examples, the virtual meeting provider 315 is able to limit the access of unintended participants or modify the security properties of the meeting that apply to that particular participant in addition to or instead of providing a notification or changing the meeting properties.

The method shown in FIG. 4 may be executed iteratively in relation to the same or different virtual meetings. For example, multiple instances of access data may be separately received by a video conference provider 310 in step 410 and then be used to determine the risk score and the resulting likelihood of disruption of a virtual meeting at blocks 450, 460. Further, a modification of a meeting security property at step 480 may be used to determine a modified risk score at step 450.

It should also be appreciated that the steps discussed above are examples and may be performed in different orders. And methods may be implemented that do not include all of the steps set out in FIG. 4. For instance, some methods may not include the step of determining a distribution score at block 430. Further, for example, in some examples, once the risk score is determined at block, the video conference provider causes the meeting to be modified at block 480. Other variations are also within the scope of this disclosure.

Further, it should be appreciated that any individual server (or group of servers) within the video conference provider 310 may perform a portion of the method. For example, one server may receive the access data and determine and identify the virtual meetings in blocks 410 and 420, while a different server calculates a risk score and continues the process beginning at block 450. Still further variations are contemplated within the scope of this disclosure.

Figure 5:
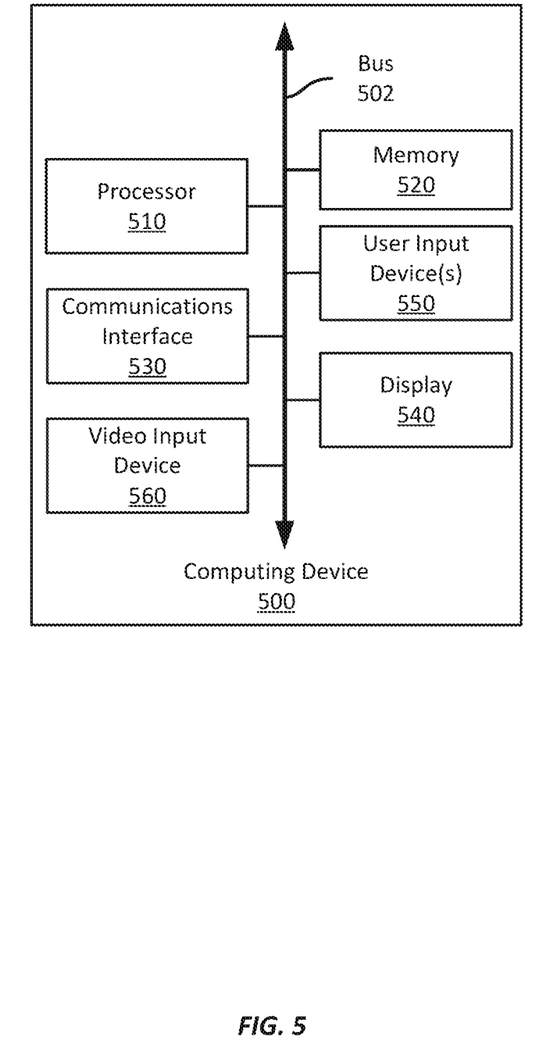
FIG. 5 illustrates an example computing device suitable for use with any disclosed systems or methods according to this disclosure.

Referring now to FIG. 5, FIG. 5 shows an example computing device 500 suitable for use in example systems or methods for identifying at-risk meetings according to this disclosure. The example computing device 500 includes a processor 510 which is in communication with the memory 520 and other components of the computing device 500 using one or more communications buses 502. The processor 510 is configured to execute processor-executable instructions stored in the memory 520 to perform one or more methods for identifying at-risk meetings according to different examples, such as part or all of the example method 400 described above with respect to FIG. 4. The computing device, in this example, also includes one or more user input devices 550, such as a keyboard, mouse, touchscreen, microphone, etc., to accept user input. The computing device 500 also includes a display 540 to provide visual output to a user. The computing device also includes a video input device 260, such as a camera.

The computing device 500 also includes a communications interface 540. In some examples, the communications interface 530 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The invention claimed is:

1. A method comprising:
receiving, by a video conferencing system, access data having a format or content associated with identifying and providing access to a virtual meeting and a source of the access data;
determining that the access data identifies and provides access to the virtual meeting;
determining a risk score based at least in part on the access data, the source of the access data, and a meeting property associated with the virtual meeting, the risk score indicating a likelihood of meeting disruption based at least in part on the risk score; and
responsive to determining that the likelihood of meeting disruption exceeds a risk threshold, generating a notification message.

2. The method of claim 1, wherein the access data comprises a virtual meeting identifier.

3. The method of claim 1, wherein the source of the access data comprises a social media post.

4. The method of claim 1, wherein the access data is received after the virtual meeting concludes.

5. The method of claim 1, wherein determining a likelihood of meeting disruption comprises is performed by an artificial intelligence system.

6. The method of claim 1, wherein the meeting property is associated with a measure of relative public accessibility of the virtual meeting.

7. The method of claim 6, wherein the likelihood of meeting disruption is directly related to the measure of relative public accessibility.

8. The method of claim 1, wherein the source of the access data comprises a context data.

9. The method of claim 8, wherein the context data comprises a hashtag.

10. The method of claim 1, wherein the risk score is further based on a reputation score of a meeting participant or device attempting to access the virtual meeting by using the access data.

11. The method of claim 1, further comprising:
determining a proposed context of the virtual meeting based at least in part on the meeting property associated with the virtual meeting; and
cancelling the virtual meeting based on the proposed context of the virtual meeting.

12. The method of claim 1, further comprising determining a distribution score based at least in part on the access data, the source of the access data, and the meeting property associated with the virtual meeting.

13. The method of claim 12, wherein the distribution score comprises a social outreach score.

14. The method of claim 1, wherein the notification message comprises an electronic message to a meeting host associated with the virtual meeting.

15. The method of claim 1, wherein the notification message causes a change to a security property associated with the virtual meeting.

16. The method of claim 1, further comprising limiting access to the virtual meeting by an uninvited participant.

17. A system comprising
a non-transitory computer-readable medium;
a communications interface; and
a processor communicatively coupled to the non-transitory computer-readable medium and the communications interface, the processor configured to execute processor-executable instructions stored in the non-transitory computer-readable medium to:

receive, by a video conferencing system, access data having a format or content associated with identifying and providing access to a virtual meeting and a source of the access data;
determine that the access data identifies and provides access to the virtual meeting;
determine a risk score based at least in part on the access data, the source of the access data, and a meeting property associated with the virtual meeting, the risk score indicating a likelihood of meeting disruption based at least in part on the risk score; and
responsive to determining that the likelihood of meeting disruption exceeds a risk threshold, generate a notification message.

18. The system of claim 17, wherein the processor is further configured to execute processor-executable instructions stored in the non-transitory computer-readable medium to:
determine a proposed context of the virtual meeting based at least in part on the meeting property associated with the virtual meeting; and
cancel the virtual meeting based on the proposed context of the virtual meeting.

19. A non-transitory computer-readable medium including processor executable instructions to cause a processor to:
receive, by a video conferencing system, access data having a format or content associated with identifying and providing access to a virtual meeting and a source of the access data;
determine that the access data identifies and provides access to the virtual meeting;
determine a risk score based at least in part on the access data, the source of the access data, and a meeting property associated with the virtual meeting, the risk score indicating a likelihood of meeting disruption based at least in part on the risk score; and
responsive to determining that the likelihood of meeting disruption exceeds a risk threshold, generate a notification message.

20. The non-transitory computer-readable medium of claim 19 further including processor executable instructions to cause a processor to:
determine a proposed context of the virtual meeting based at least in part on the meeting property associated with the virtual meeting; and
cancel the virtual meeting based on the proposed context of the virtual meeting.

* * * * *